Patented Nov. 17, 1942

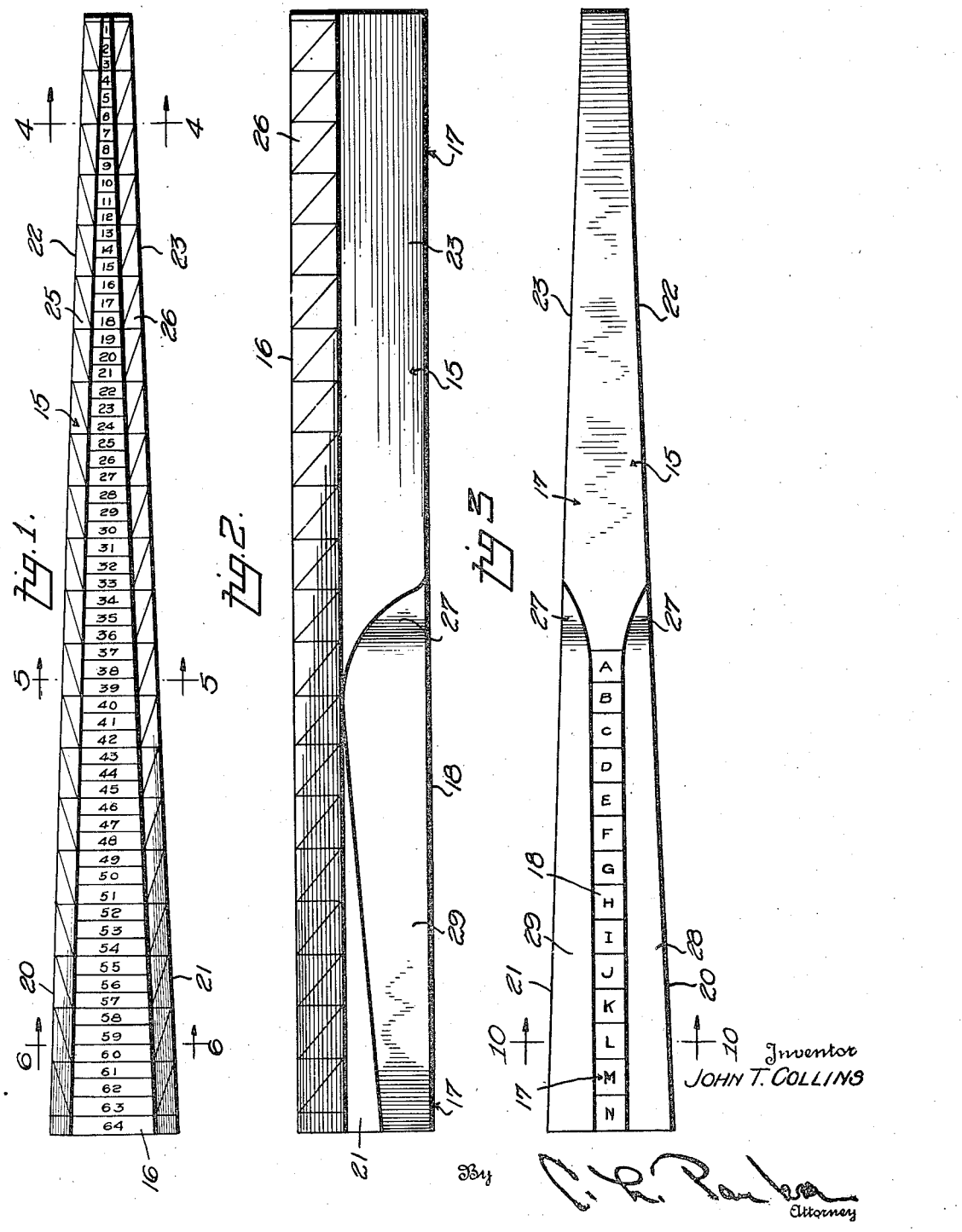

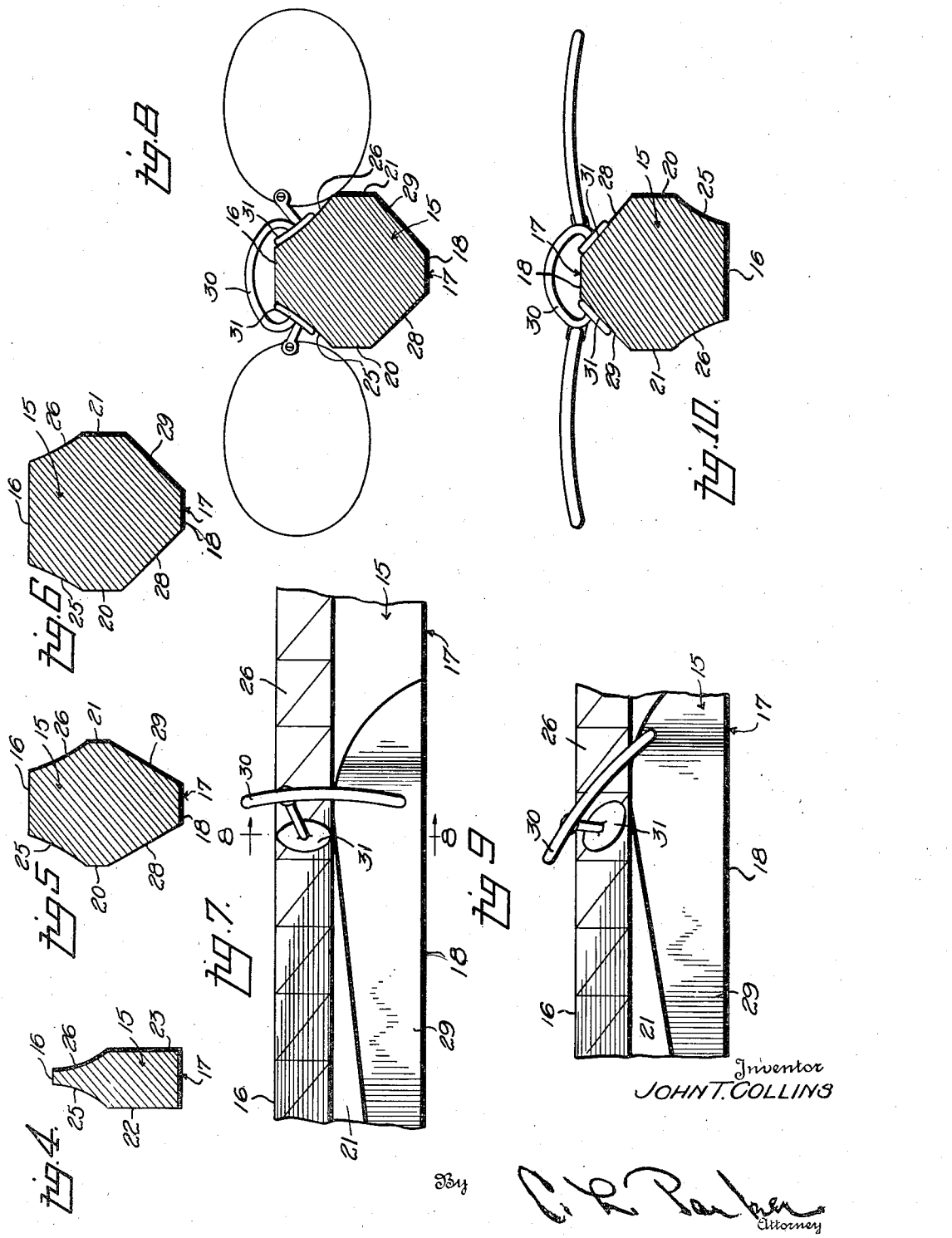

2,302,190

UNITED STATES PATENT OFFICE 2,302,190

ROCKING PAD SPACING AND ANGLE GAUGE

John T. Collins, Charleston, W. Va.

Application March 25, 1941, Serial No. 385,185

4 Claims. (Cl. 33—200)

This invention relates to measuring devices and particularly to measuring rods of a type adapted to measure the angles of and distances between the rocking pads of eye glasses or spectacles.

Heretofore, it has been the practice of manufacturers to furnish the bridges for eye glasses to optometrists and opticians, etc. in certain definite sizes or widths extending generally from a minimum width of eighteen millimeters to a maximum width of twenty-six millimeters. The rocking guards or pads which support the eye glasses on the nose of the wearer are attached to the bridge by flexible lengths of metal called "pad arms" which are bendable by means of pliers so as to adjust the rocking pads to any desired position. Obviously, the rocking pads attached to any given bridge may thus be bent into literally hundreds of different positions of adjustment.

The accurate fitting and each subsequent adjustment of a pair of glasses has heretofore required the presence of the wearer for each adjustment in order that the fitter may determine the proper angular position and correct spacing of the rocking pads so that the glasses may rest comfortably in proper adjustment on the nose of the wearer. However, as is well known, it is often inconvenient or impossible for the wearer of glasses to be personally fitted therewith.

Accordingly, it is the main object of the present invention to provide a gauge which may be inserted between the rocking pads of a pair of eye glasses to indicate the spacing and angularity of the rocking pads.

It is a further object to provide a gauge having a set of measuring standards which will permit the accurate fitting of eye glasses without requiring the presence of the wearer after the properly adjusted position of the rocking pads has once been determined and recorded.

It is a further object to provide a gauge having a set of measuring standards which are so arranged physically with respect to each other that an accurate fitting of glasses can be made from a set of measurements obtained from the gauge.

A further object is to provide a device for measuring the adjustment of the rocking pads of any pair of glasses so that the individual requirements of the wearer thereof may be accurately ascertained.

A further object is to provide means whereby the adjustment of the rocking pads of a pair of glasses to the nose of a wearer may be definitely determined for a future replacement without requiring the presence of the wearer.

A further object is to provide a measuring device which may be used to quickly and easily determine the angular position of and the distance between the rocking pads of the bridge of any pair of glasses.

A further object is to provide a measuring rod of novel structure by which accurate measurements of the adjusted positions of the rocking pads of eye glasses may be determined.

Other objects and advantages of the invention will become apparent during the course of the following description.

In the drawings I have disclosed one embodiment of my invention. In this showing:

Figure 1 is a top plan view of the invention,

Figure 2 is a side elevation thereof,

Figure 3 is a bottom plan view thereof,

Figure 4 is a vertical section taken on line 4—4 of Figure 1,

Figure 5 is a vertical section taken on line 5—5 of Figure 1,

Figure 6 is a vertical section taken on line 6—6 of Figure 1,

Figure 7 is a fragmentary side elevation of the invention inserted between the rocking pads of a pair of eye glasses, Figure 8 is a vertical sectional view of the invention taken on line 8—8 of Figure 7, with the glasses shown in elevation, Figure 9 is a view similar to Figure 7 with the glasses arranged at an angle to the length of the invention, and, Figure 10 discloses the section shown in Figure 6 in inverted position with a pair of eye glasses mounted thereon.

In the drawings, the numeral 15 designates the gauge constituting the invention which in the present embodiment is in the form of a tapered rod as seen in Figures 1 and 3 and having a plurality of longitudinally extending surfaces to be referred to. The top surface 16 is similarly tapered from end to end of the gauge 15. This surface is arbitrarily divided off into sections which are numbered consecutively from the small end of the gauge as shown, for a purpose to be described.

The bottom surface 17, from a point substantially midway of its length to its right end as shown in Figure 3, is coextensive in width with the gauge 15 and accordingly is tapered to correspond thereto. The bottom surface 17 extends from the same point of the gauge to the left or larger end thereof (Figure 3) and is of constant breadth throughout the greater portion of its length. This latter portion of the bottom surface 17 of the gauge 15, indicated by the numeral 18, is also arbitrarily divided into spaces and lettered alphabetically as shown (Figure 3) for a purpose to be described. The gauge is also provided with vertically extending side portions 20 and 21 which are longitudinal extensions of its vertical sides 22 and 23 respectively. It will become apparent, however, that the surface of the side portions may assume any configuration.

The gauge body is chamfered to provide opposite angular surfaces 25 and 26, the upper edges of which are coincident with the edges of the surface 16. The surfaces 25 and 26 diverge at an equal angle with respect to the surface 16, the acute angle between each surface 25 and 26 and the plane of the surface 16 being preferably about 75°. The surfaces 25 and 26 are of uniform width and extend throughout the length of the gauge body, and are preferably slightly concaved transversely thereof to better adapt these surfaces for engagement with the rocking pads of the glasses as will become apparent.

Intermediate its ends the gauge body is cut into the lower edges thereof (Figures 2, 3 and 9) as at 27, and from the inner extremity of the grooved surface thus formed the cut is continued to the larger end of the gauge body to form upwardly diverging surfaces 28 and 29. At each point in its length, each surface 28 and 29 is approximately flat transversely thereof. However, the angularity of each of these surfaces uniformly changes from the larger end of the gauge body to the point at which the corresponding cut 27 commences. This angular arrangement of each of the cut surfaces 28 and 29 is preferably such that the angle formed between each such surface and the plane of the surface 17 is approximately 75° at the larger end of the gauge body and decreases to approximately 40° at the inner end of each of the surfaces, the latter angle being shown in Figure 5. With such an arrangement of the surfaces 28 and 29, a pair of eye glasses 30 may be arranged with the rocking pads 31 thereof in engagement with the surfaces 28 and 29 with the approximate plane or lenses of the glasses parallel to the plane of the surface 17, whereupon the glasses may be moved longitudinally with respect to the gauge (Figure 10). At some point in the lengths of the surfaces 28 and 29, for example, at the space K (Figure 3) the rocking pads 31 will be found to approximately fit the angularity of the surfaces 28 and 29, and the position thus located will be recorded, as further described below.

It will now be apparent that a gauge has been provided having a flat top surface 16 which tapers from the large end of the gauge to substantially a point at the small end thereof and having adjoining inclined surfaces or sides 25 and 26 set at equal and continuous angles with respect to the top surface 16 as seen in Figures 1, 2, 7 and 9. The surfaces 25 and 26 are arbitrarily divided into sections by means of lines coincident with the dividing lines of every third section of the top surface 16 and include diagonal lines connecting these side divisional lines.

The lines on surfaces 25 and 26 are given arbitrary angular designations. For example, the vertically extending division lines (Figures 1, 2, 7 and 9) are 90° lines whereas the diagonally extending lines are 45° lines. Obviously, a pair of rocking pads 31 intermediate the two angular positions shown in Figures 7 and 9 would occupy a 67½° position.

These angular designations do not indicate the angular position of the rocking pads 31 with respect to a vertical plane perpendicular to and through the center of the bridge of the eye glasses 30. They indicate merely the angular position of the rocking pads 31 on the surfaces 25 and 26 of the gauge 15 when the pads are fitted to such surfaces. Likewise the numbers on surface 16 merely indicate that at that point on the gauge, the rocking pads 31 fit flush to the surfaces 25 and 26 while the tops of the pads are kept in the same horizontal plane as the surface 16 to thus determine the spacing of the pads.

This construction provides means whereby the spacing of the rocking pads of glasses may be determined and also the angular position of the rocking pads with respect to the vertical plane passing through the center of the bridge of a pair of glasses in a direction perpendicular to the approximate plane of the lenses of the glasses. In order that the angle which the plane of the rocking pads 31 makes with the principal plane of the glasses 30 may be determined (Figure 10), the particular arrangement of the bottom surface 17 and divergent planes 28 and 29 is provided as described. The third angle which the rocking pads makes with respect to the principal plane of the glasses is more or less constant and being seldom changed, need not be taken into account.

Accordingly with the gauge comprising this invention it is possible, by inserting the rod 15 between the rocking pads 31 of the glasses 30, to determine the spacing and important angular positions of these pads so that a record of such position can be made in order that a future replacement of any pair of glasses may be made without necessitating the personal presence of the wearer thereof. While the rocking pads themselves are pivotally connected to the pad arms in order to afford a rocking movement of about 10° in a vertical direction and about 5° in a horizontal direction, it has been found unnecessary to consider this rocking movement in taking the required measurements of the position of the pads.

As hereinbefore pointed out the numbers on the top surface 16 and the letters on the bottom surface 17 and no significance apart from the gauge itself and act merely as a set of measuring standards by which a record can be made of the position of adjustment of the rocking pads 31 of any pair of glasses 30. Likewise the angular lines connecting the division lines on the inclined plane surfaces 25 and 26 have no significance apart from the gauge itself but merely indicate that on the gauge a certain pair of glasses assumes a certain angular position when the pads 31 are perfectly fitted thereto.

Measurements of the angularity or spacing of the rocking pads of eye glasses or spectacles are made as follows:

For purposes of illustration, Figures 7, 8, 9 and 10 disclose a pair of eye glasses 30 of which the spacing and angularity of the pads 31 are to be measured. The large end of the gauge 15 is held in the left hand by means of the vertical surfaces 20 and 21 and the glasses are held in the right hand by means of the bridge. The rocking pads 31 are then placed on the inclined surfaces 25 and 26 on opposite sides of the tapered top surface 16 (Figure 8) so that the top edges of the rocking pads are flush with the top surface 16 (Figure 7). The glasses are now slid along the inclined surfaces 25 and 26 until the pads 31 fit snugly thereon. The adjacent number on the top surface 16 of the gauge 15 is then noted and recorded, this being an arbitrary number and indicating the spacing of the rocking pads in so far as this particular gauge is concerned. Next the gauge 15 is turned over and with the plane of the lenses of the glasses 30 parallel to the plane of the top surface 16, the rocking pads 31 are now placed on the inclined planes 28 and 29 (Figure 10) of the gauge 15 and slid along the surfaces until the pads again fit snugly thereto. As the angle which the surfaces 28 and 29 make with the bottom surface 17 changes or decreases from the mid point of the gauge to the large end thereof it will be obvious that at some position along these surfaces the rocking pads 31 will fit snugly against the surfaces 28 and 29. Accordingly, if on the upper surfaces 25 and 26 the rocking pads were found to fit flush therewith in a vertical position at section numbered "59," for example, and if the pads were found to fit on the bottom surfaces 28 and 29 at point L this particular spacing and angular adjustment of the rocking pads 31 would be recorded as number 59 at 90° L.

However, if the rocking pads 31 of a pair of glasses such as shown in Figure 8 cannot be made to fit flush in a vertical position along the inclined planes 25 and 26, the glasses 30 are pivoted as shown at Figure 9 until they will fit flush with these inclined surfaces. To accomplish this, the glasses or bridge thereof is slid to a width number greater than apparently necessary until the pads 31, the tops of which are still flush with the top surface 16, are found to perfectly fit the inclined planes 25 and 26. This position of adjustment of the rocking pads would then be recorded as 65 at 45° L, if the subsequent measure on the bottom of the lettered side of the gauge indicates that this second angularity may be indicated as L. It is possible that the pads of the glasses will fit flush at an angular position with respect to the vertical division marks on the inclined planes 25 and 26 of less than or more than the arbitrary angle 45. If such is the case the position at which the pads fit the surfaces 25 and 26 is indicated as, for example, 59 at 67° L or 59 at 22° L.

It has been found that the angle seldom exceeds 67° and seldom is below 22°. Likewise, with respect to the use of the lower surface 17, it has been found that the arbitrary position B of the letters is the average while the letters near the end of the alphabet are mainly used for juvenile, flat or negroid noses.

For very accurate fittings it is possible to slip shims under the rocking pads to hold them rigid and prevent their rocking movement, both when fitting a patient and when using the gauge. This makes possible a very close duplication of the spacing and angular adjustment of the pads but is not ordinarily necessary as the 5° front to back rock or the 10° vertical or up and down rock provides sufficient allowance for a slight degree of error. If it should be found necessary to bend the pads to a higher or lower position than normal, this is done before the taking of measurements and the recording thereof.

The gauge as described may be formed of wood, metal, plastic or any desired composition and of course is admirably suited for quantity production, and if cast, a very simple mold would be required. It is immaterial what length or size of gauge is used as it is obvious that if the principles set forth herein are observed it is possible to measure and record for purposes of future replacement the spacing and angular adjustment of the rocking pads of any pair of glasses. A very convenient and practical means of measuring the spacing and angular positions of the rocking pads of eye glasses and spectacles has thus been provided as well as an arbitrary set of measuring standards whereby future fittings of eye glasses may be readily accomplished without the necessity of the personal attendance of the wearer after the properly adjusted position of the rocking pads to the nose of the wearer has once been determined and recorded.

From the foregoing it will be apparent that the present gauge may be readily used to measure the original adjustment of the pads of a pair of glasses, personally fitted and then to so express the measurements etc. in numbers, letters and angles that they can be recorded with the other measurements of a pair of glasses (prescription of lenses, size and shape of lenses, drilling detail, width and depth of bridge, pupillary distance, length and angle of temples, etc.). The adjustment of the pads heretofore has involved the only inexpressible measurements of a pair of glasses.

Accordingly one personal visit is all that is necessary for the fitting of the pads, after which it is possible to mail a pair of glasses direct to the wearer and have them properly fit his nose. In the event a pair of glasses are lost or broken, or if for any other reason a duplicate pair is desired, the original adjustment of the pads may be duplicated by referring to the record made at the first fitting. The gauges are all exact duplicates of the original or master gauge so that the optometrist or optician can mail or wire his pad gauge record to other optometrists, opticians or optical supply houses at any other locality and have the original adjustment duplicated. The device also enables wholesale opticians to make required adjustment of the pads and to mail glasses direct to the wearer without further need of pad adjustment.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A gauge for the pads of eye glasses comprising an elongated body having a width-gauging face the longitudinal edges of which diverge toward one end of the body, said body having angle-gauging faces having corresponding longitudinal edges coinciding with the respective longitudinal edges of said width-gauging face, said angle-gauging faces diverging from said coinciding edges at equal angles relative to said width-gauging face, the glasses being adapted to assume a gauging position with the pads thereof substantially flat against said angle-gauging faces and with their upper ends flush with said width-gauging face, said width-gauging and angle-gauging faces respectively having spaced indicia and angle-indicating lines thereon.

2. A gauge for the pads of eye glasses comprising an elongated body having a width-gauging face normally forming the top face of the body and having its longitudinal edges diverging toward one end of the body, said body also having angle-gauging faces diverging downwardly from said width-gauging face at equal angles with respect thereto, the upper longitudinal edges of said angle-gauging faces coinciding with the respective longitudinal edges of said width-gauging face, said angle-gauging faces being engageable with the inner faces of the pads of a pair of eye glasses whereby such pads may be slid therealong until the upper ends of the pads are flush with said width-gauging face and rocked, if necessary, to substantially fit the pads against said angle-gauging faces and thus complete the placing of the pads in gauging position, said width-gauging face being provided with indicia spaced therealong to indicate the spacing of the pads and said angle-gauging face having arbitrary lines thereon to give an indication which will be the result of the angularity of the pads relative to each other in the plane of the lenses of the eye glasses.

3. A gauge for the pads of eye glasses comprising an elongated body having a relatively flat face provided with longitudinally spaced indicia, said body having a pair of faces engageable with the pads of the eye glasses, each face of said pair having one longitudinal edge coinciding with a longitudinal edge of said flat face and the faces of said pair diverging uniformly away from said flat face, the pads of the eye glasses being adapted to assume a position substantially fitting against the faces of said pair whereupon the adjacent indicia on said flat face may be read to determine a given relation between the eye glass pads.

4. A gauge for the pads of eye glasses comprising an elongated body having a relatively flat face having parallel longitudinal edges provided with longitudinally spaced indicia, said body having a pair of faces engageable with the pads of the eye glasses, each face of said pair having one longitudinal edge coinciding with a longitudinal edge of said flat face and the faces of said pair diverging uniformly away from said flat face, the angularity of the faces of said pair relative to each other progressively and uniformly varying from end to end of such faces, the pads of the eye glasses being adapted to assume a position substantially fitting against the faces of said pair whereupon the adjacent indicia of said flat face may be read to determine a relative angularity of the pads.

JOHN T. COLLINS.